US007681474B2

(12) United States Patent
Weldon et al.

(10) Patent No.: US 7,681,474 B2
(45) Date of Patent: Mar. 23, 2010

(54) SYSTEM FOR ADJUSTING THE PEDALS OF A VEHICLE

(75) Inventors: Craig Andrew Weldon, Ontario (CA); Frank Wiemer, Ontario (CA); Edward Kunath, Detroit, MI (US); Jacob Ritchie, Ontario (CA)

(73) Assignee: Continental Automotive Systems US, Inc., Auburn Hills, MI (US)

( * ) Notice: Subject to any disclaimer, the term of this patent is extended or adjusted under 35 U.S.C. 154(b) by 1063 days.

(21) Appl. No.: 10/969,321

(22) Filed: Oct. 21, 2004

(65) Prior Publication Data

US 2006/0086200 A1 Apr. 27, 2006

(51) Int. Cl.
*G05G 1/30* (2008.04)
*H02K 11/00* (2006.01)

(52) U.S. Cl. .............................. 74/512; 74/513; 74/560; 310/71

(58) Field of Classification Search ................... 74/512, 74/513, 560; 310/71, 89, 239; 188/156
See application file for complete search history.

(56) References Cited

U.S. PATENT DOCUMENTS

| | | | | |
|---|---|---|---|---|
| 4,470,570 | A | | 9/1984 | Sakurai et al. |
| 5,010,782 | A | | 4/1991 | Asano et al. |
| 5,056,742 | A | | 10/1991 | Sakurai |
| 5,063,811 | A | | 11/1991 | Smith |
| 5,241,936 | A | | 9/1993 | Byler |
| 5,385,068 | A | | 1/1995 | White et al. |
| 5,460,061 | A | | 10/1995 | Redding et al. |
| 5,632,183 | A | | 5/1997 | Rixon et al. |
| 5,722,302 | A | * | 3/1998 | Rixon et al. .................. 74/512 |
| 5,819,593 | A | | 10/1998 | Rixon et al. |
| 5,964,125 | A | * | 10/1999 | Rixon et al. .................. 74/514 |
| 6,099,324 | A | * | 8/2000 | Janssen et al. ............ 439/76.1 |
| 6,109,241 | A | | 8/2000 | Engelgau |
| 6,151,976 | A | | 11/2000 | Inoue |
| 6,237,565 | B1 | | 5/2001 | Engelgau |
| 6,249,068 | B1 | * | 6/2001 | Knopp ........................ 310/71 |
| 6,431,304 | B1 | * | 8/2002 | Smythe ...................... 180/334 |
| 6,450,061 | B1 | * | 9/2002 | Chapman et al. .............. 74/512 |
| 6,510,761 | B2 | * | 1/2003 | Zhang et al. .................. 74/512 |

(Continued)

FOREIGN PATENT DOCUMENTS

DE 102 08 077 A1 * 9/2003

OTHER PUBLICATIONS webopedia.com/TERM/c/controller.html (three pages) 2009.*
http://dictionary.reference.com/browse/controller (Jun. 1, 2009).*

*Primary Examiner*—Vinh T. Luong

(57) ABSTRACT

A system for adjustably positioning foot pedals with respect to a vehicle chassis, such as to improve ergonomics or to appropriately space a vehicle occupant with respect to a vehicle safety system. The system includes first and second electromagnetic actuators, first and second controllers, and a device, which may be a switch disposed on the vehicle chassis, provides a signal to change spacing between the vehicle chassis and the plurality of pedals. The first electromagnetic actuator displaces a first pedal with respect to the vehicle chassis, and the second electromagnetic actuator displaces a second pedal with respect to the vehicle chassis. The first controller operates the first electromagnetic actuator in response to the configuration of the device, and the second controller operates the second electromagnetic actuator in response to the first controller operating the first electromagnetic actuator.

24 Claims, 6 Drawing Sheets

U.S. PATENT DOCUMENTS

| | | | | |
|---|---|---|---|---|
| 6,533,082 | B2 * | 3/2003 | Gill et al. | 188/156 |
| 6,698,309 | B2 | 3/2004 | Rixon et al. | 74/512 |
| 6,759,783 | B2 * | 7/2004 | Hager et al. | 310/239 |
| 6,766,713 | B2 * | 7/2004 | Sundaresan et al. | 74/512 |
| 6,799,487 | B2 | 10/2004 | Garland et al. | 74/512 |
| 6,906,438 | B2 * | 6/2005 | Ursel et al. | 310/89 |
| 6,925,904 | B2 * | 8/2005 | Sundaesan et al. | 74/512 |
| 7,270,028 | B2 * | 9/2007 | Rixon et al. | 74/512 |
| 2003/0121354 | A1 | 7/2003 | Rixon et al. | |
| 2003/0121355 | A1 | 7/2003 | Rixon et al. | |
| 2004/0244527 | A1 * | 12/2004 | Rixon et al. | 74/560 |
| 2006/0037426 | A1 * | 2/2006 | Teller | 74/512 |

* cited by examiner

SYSTEM FOR ADJUSTING THE PEDALS OF A VEHICLE

FIELD OF THE INVENTION

An adjustable pedal assembly is used in an automotive vehicle to vary the operating position of one or more of the foot pedals that control various vehicle systems, such as the engine throttle, brake system and clutch.

BACKGROUND OF THE INVENTION

A known adjustable pedal assembly uses an electrical motor to rotate a drive cable that, in turn, rotates a worm gear to adjust the position of a pedal. Other known assemblies eliminate the cable and connect the worm gear more directly to a pedal lever. These known systems are believed to suffer from a number of disadvantages, which include large numbers of parts, excessive noise and imprecise output. Another disadvantage of these know assemblies is believed to be the large size requirements within the tight confines of the driver's footwell.

In accordance with the standards that have been promulgated by various government regulatory agencies as to the position of the brake pedal relative to the position of the engine throttle control pedal, some known assemblies use one motor to drive the adjustment of more than one pedal.

SUMMARY OF THE INVENTION

The present invention provides a system that adjustably positions a plurality of pedals, including an engine throttle control pedal and a brake system pedal, with respect to a vehicle chassis. The system includes first and second electromagnetic actuators, first and second controllers, and a device that provides a signal to change spacing between the vehicle chassis and the plurality of pedals. The first electromagnetic actuator displaces a first one of the engine throttle control and brake system pedals with respect to the vehicle chassis, and the second electromagnetic actuator displaces a second one of the engine throttle control and brake system pedals with respect to the vehicle chassis. The device, which is disposed on the vehicle chassis, has a first configuration that provides a first signal to increase the spacing between the vehicle chassis and the first and second pedals, and a second configuration that provides a second signal to decrease the spacing between the vehicle chassis and the first and second pedals. The first controller operates the first electromagnetic actuator in response to the device being positioned in either of the first and second configurations, and the second controller operates the second electromagnetic actuator in response to the first controller operating the first electromagnetic actuator.

The present invention also provides a system that adjustably positions with respect to a vehicle chassis a plurality of pedals, which may include an engine throttle control pedal and a brake system pedal. The system includes first and second electromagnetic actuators, first and second controllers, and a device that provides a signal to change spacing between the vehicle chassis and the plurality of pedals. The first electromagnetic actuator displaces a first one of the engine throttle control and brake system pedals with respect to the vehicle chassis, and includes a first housing. The second electromagnetic actuator displaces a second one of the engine throttle control and brake system pedals with respect to the vehicle chassis, and includes a second housing that is spaced from the first housing. The device, which is disposed on the vehicle chassis, has a first configuration that provides a first signal to increase the spacing between the vehicle chassis and the first and second pedals, and a second configuration that provides a second signal to decrease the spacing between the vehicle chassis and the first and second pedals. The first controller operates the first electromagnetic actuator in response to the device being positioned in either of the first and second configurations. The second controller operates the second electromagnetic actuator in response to the first controller operating the first electromagnetic actuator.

The present invention also provides a system that adjustably positions with respect to a vehicle chassis a plurality of pedals, which may include an engine throttle control pedal and a brake system pedal. The system includes first and second electromagnetic actuators, first and second controllers, and a device that provides a signal to change spacing between the vehicle chassis and the plurality of pedals. The first electromagnetic actuator displaces a first one of the engine throttle control and brake system pedals with respect to the vehicle chassis, and includes a first housing. The second electromagnetic actuator displaces a second one of the engine throttle control and brake system pedals with respect to the vehicle chassis, and includes a second housing that is spaced from the first housing. The device, which is disposed on the vehicle chassis, has a first configuration that provides a first signal to increase the spacing between the vehicle chassis and the first and second pedals, and a second configuration that provides a second signal to decrease the spacing between the vehicle chassis and the first and second pedals. The first controller, which is disposed in the first housing, operates the first electromagnetic actuator in response to the device being positioned in either of the first and second configurations. The second controller, which is disposed in the second housing, operates the second electromagnetic actuator in response to the first controller operating the first electromagnetic actuator.

BRIEF DESCRIPTION OF THE DRAWINGS

The accompanying drawings, which are incorporated herein and constitute part of this specification, illustrate presently preferred embodiments of the invention, and, together with the general description given above and the detailed description given below, serve to explain features of the invention. Like numerals indicate like or corresponding parts throughout the several views.

DETAILED DESCRIPTION OF THE PREFERRED EMBODIMENT

Figure 1:
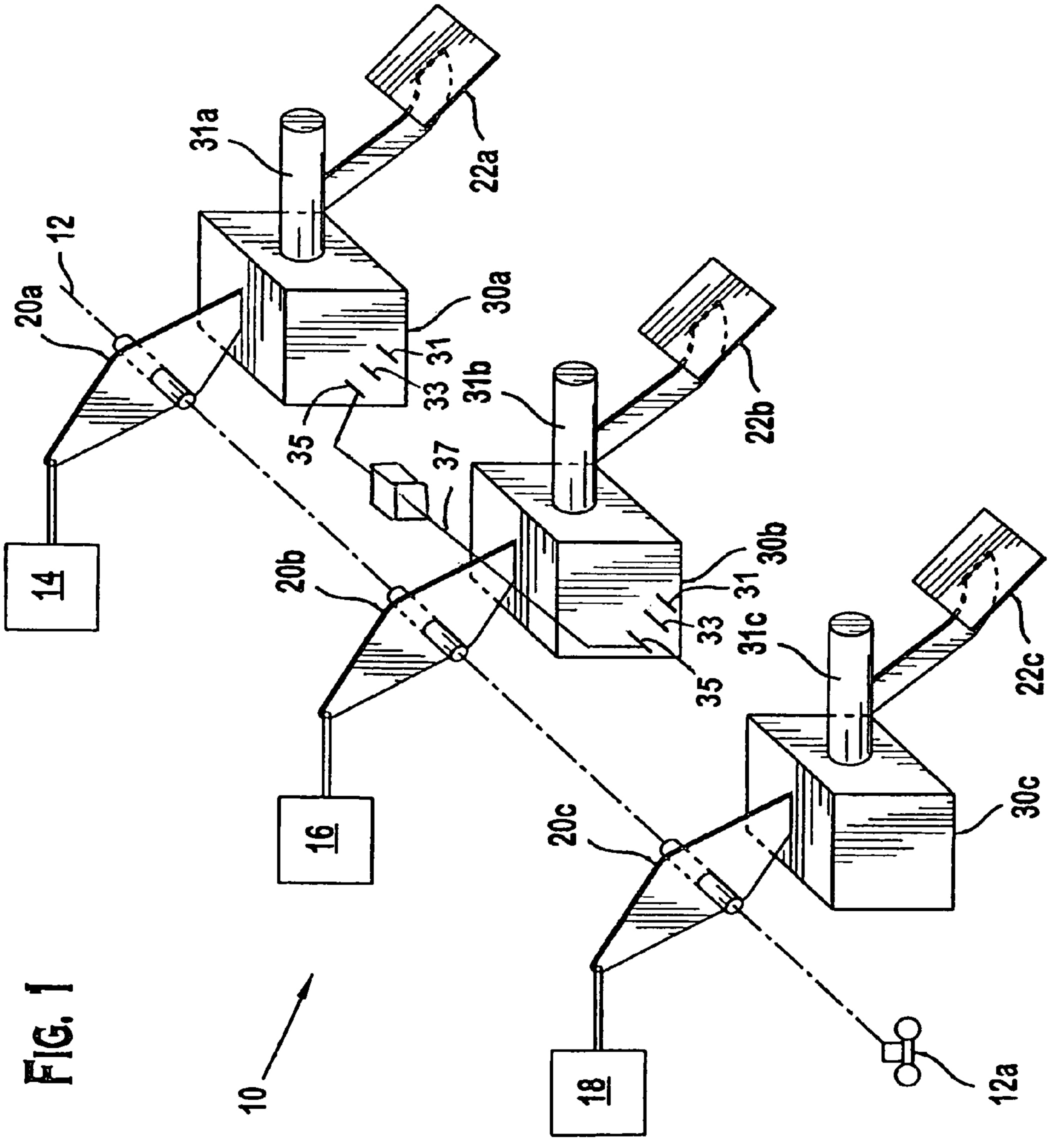
FIG. 1 is schematic view of an adjustable pedal system according to a preferred embodiment.
Figure 2:
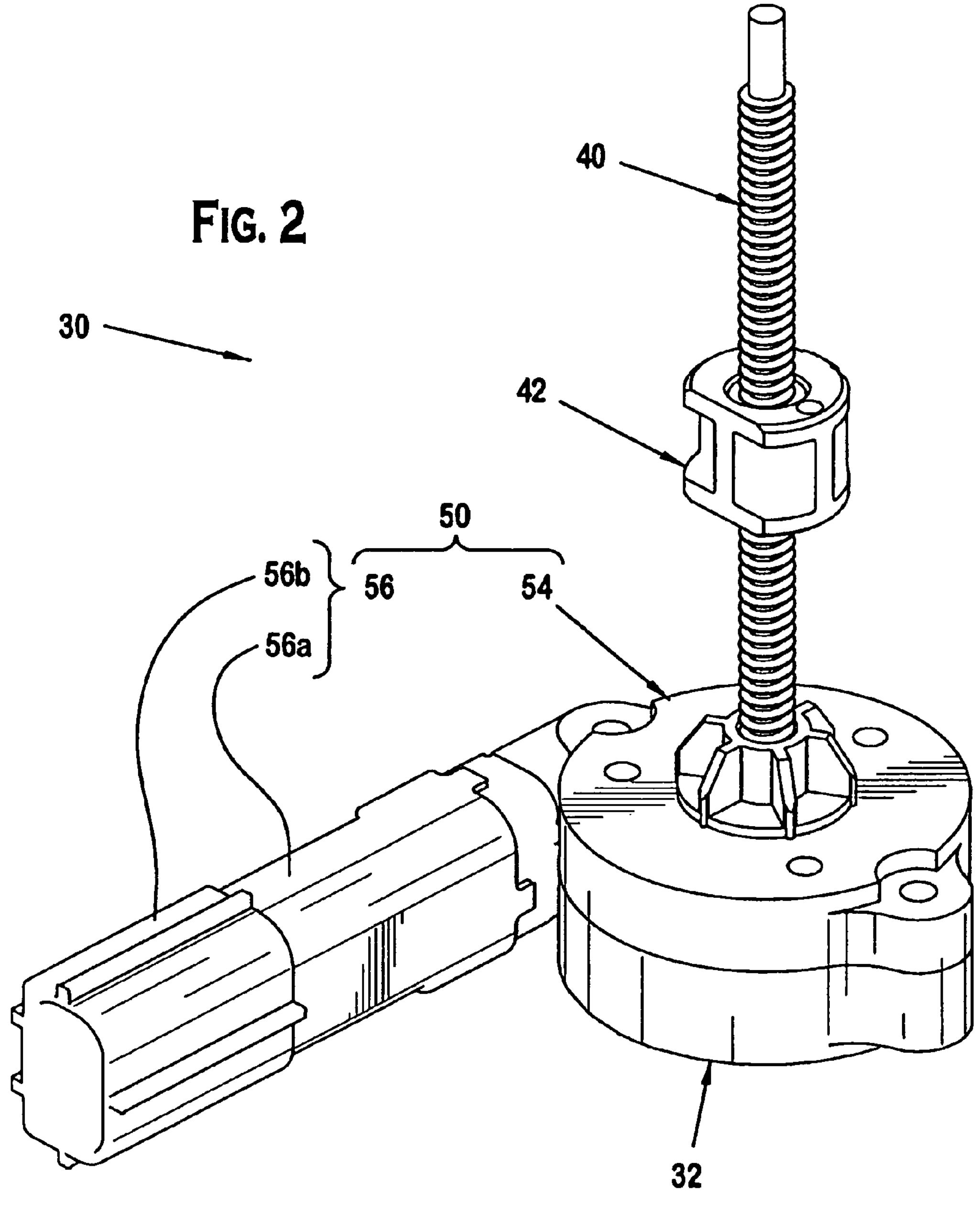
FIG. 2 is a isometric view of a preferred embodiment of an apparatus for adjustably positioning a foot-operated control with respect to a vehicle chassis.
Figure 3:
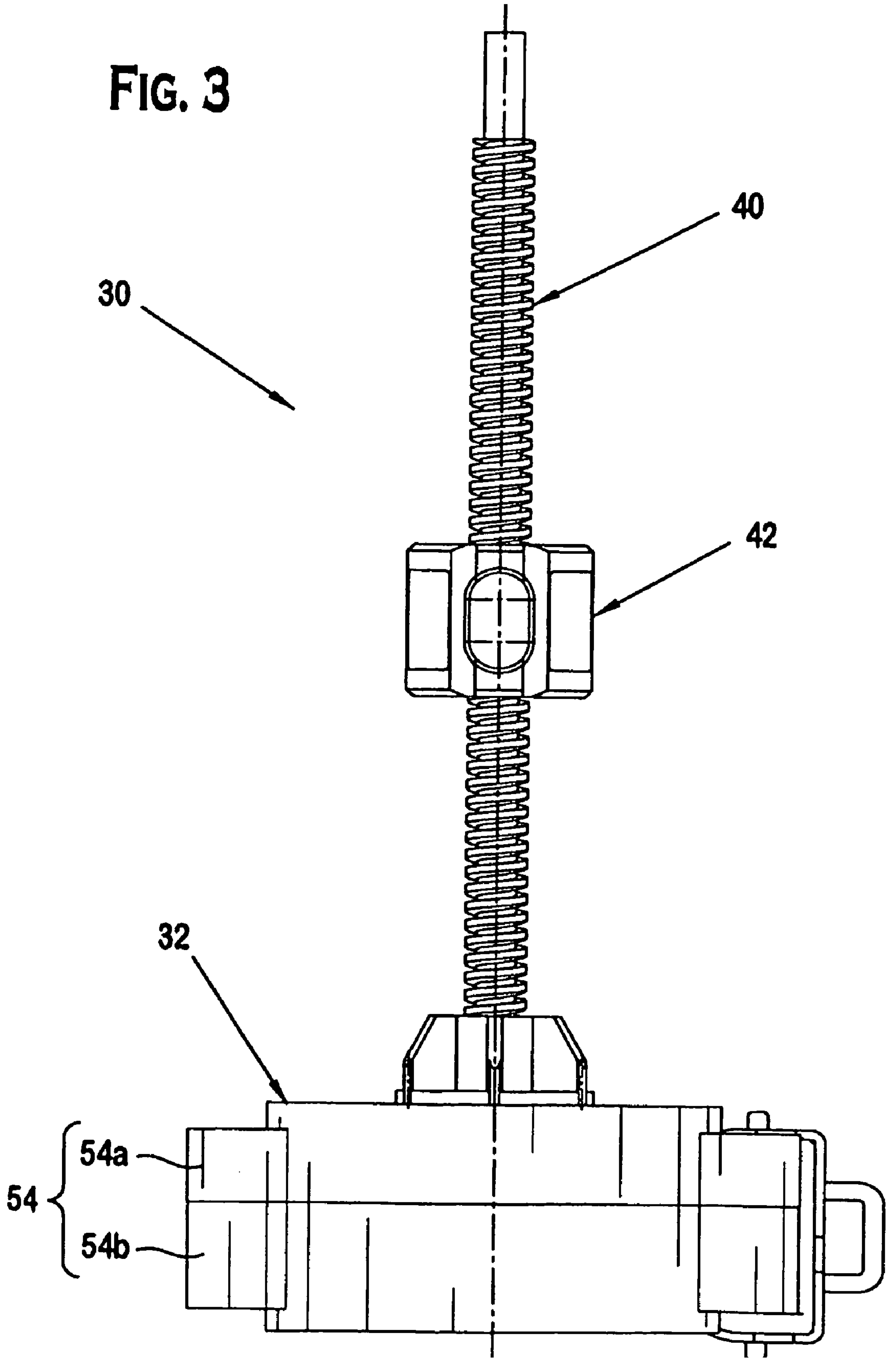
FIG. 3 is an axial longitudinal view of the preferred embodiment of an apparatus shown in FIG. 2.
Figure 4:
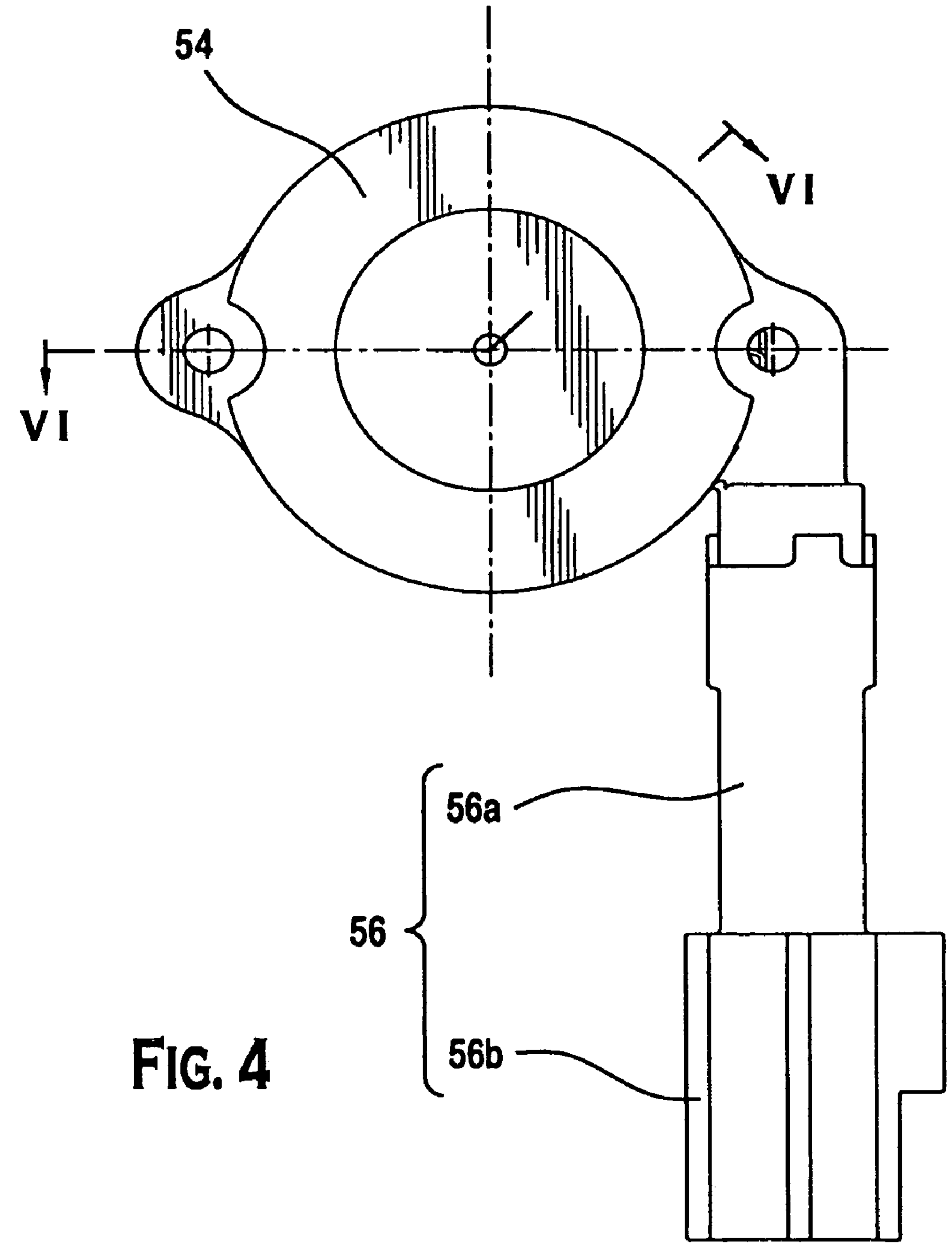
FIG. 4 is an axial end view of the preferred embodiment of an apparatus shown in FIG. 2.
Figure 5:
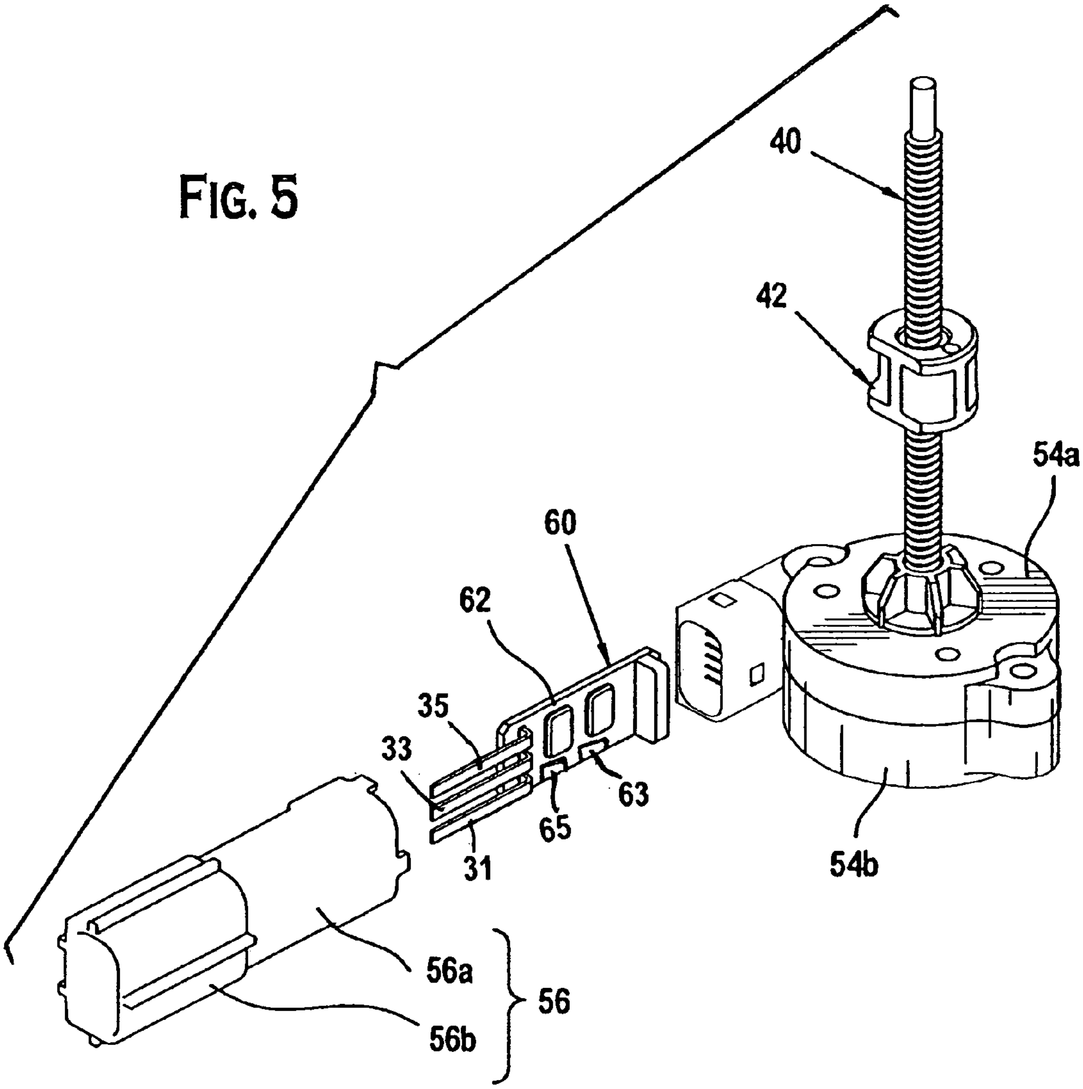
FIG. 5 is an exploded isometric view of the preferred embodiment of an apparatus shown in FIG. 2.

Referring initially to FIG. 1, an adjustable pedal assembly is generally shown at 10. The adjustable pedal assembly 10 is shown as having a common pivot axis 12 with respect to a vehicle chassis, which is schematically indicated at 12*a*; however, the pivot axes for different pedals may not be collinear.

A first pedal lever 20*a* is pivotally supported for rotation about the pivot axis 12 with respect to the vehicle chassis 12*a*. Similarly, a second pedal lever 20*b* and a third pedal lever 20*c* are also pivotally supported for rotation about the pivot axis 12 with respect to the vehicle chassis 12*a*. FIG. 1 shows three pedal levers 20*a*, 20*b*, 20*c*, which may be operatively associated with an engine throttle control system 14, a brake system 16, and a clutch 18, respectively. However, there may be fewer than three pedal levers, e.g., in the case of a vehicle equipped with an automatic transmission such that there would be only first and second pedal levers 20*a*, 20*b*, or more than three pedal levers, e.g., additionally including a foot-operated parking brake. For each pedal lever 20*a*, 20*b*, 20*c* there is a pedal 22*a*, 22*b*, 22*c*, respectively, which is engaged by a vehicle operator's foot. The particulars of a pedal lever are described in U.S. patent application Ser. No. 10/969,322, filed on Oct. 21, 2004 ("Actuator Apparatus Incorporating a Controller;"), which is hereby incorporated by reference in its entirety.

Interconnecting a pedal lever and a corresponding pedal is an actuator 30*a*,30*b*,30*c* that displaces the respective pedal relative to the pedal lever. Each actuator may include a drive source, such as an electric motor, and may include a linkage, such as a rotary to linear motion converter. Relative displacement is directed by guides 31*a*,31*b*,31*c*, which may be tubular with longitudinal slots. U.S. Pat. Nos. 5,722,302 and 5,964,125 and 6,698,309, which show a drive source and a linkage for an adjustable pedal, are hereby incorporated by reference it their entireties.

Referring now to FIGS. 2-6, there is shown a preferred embodiment of an actuator 30 including an electrically operated motor 32 providing a rotary drive source. The electric motor 32 may sequential move in discrete angular increments, e.g., a stepper motor, or may move in a continuous manner, e.g., a brushless motor. Preferably, the motor 32 rotates a threaded rod 40, which results in linear displacement of a nut 42 that is cooperatively engaged with the threaded rod 40. Alternatively, the motor 32 could rotate a nut causing linear displacement of a cooperatively engaged threaded rod. Further, other types of rotary to linear motion converters, e.g., rack and pinion gearing or worm gearing, could be used to displace a pedal 22 with respect to a lever 20.

Figure 6:
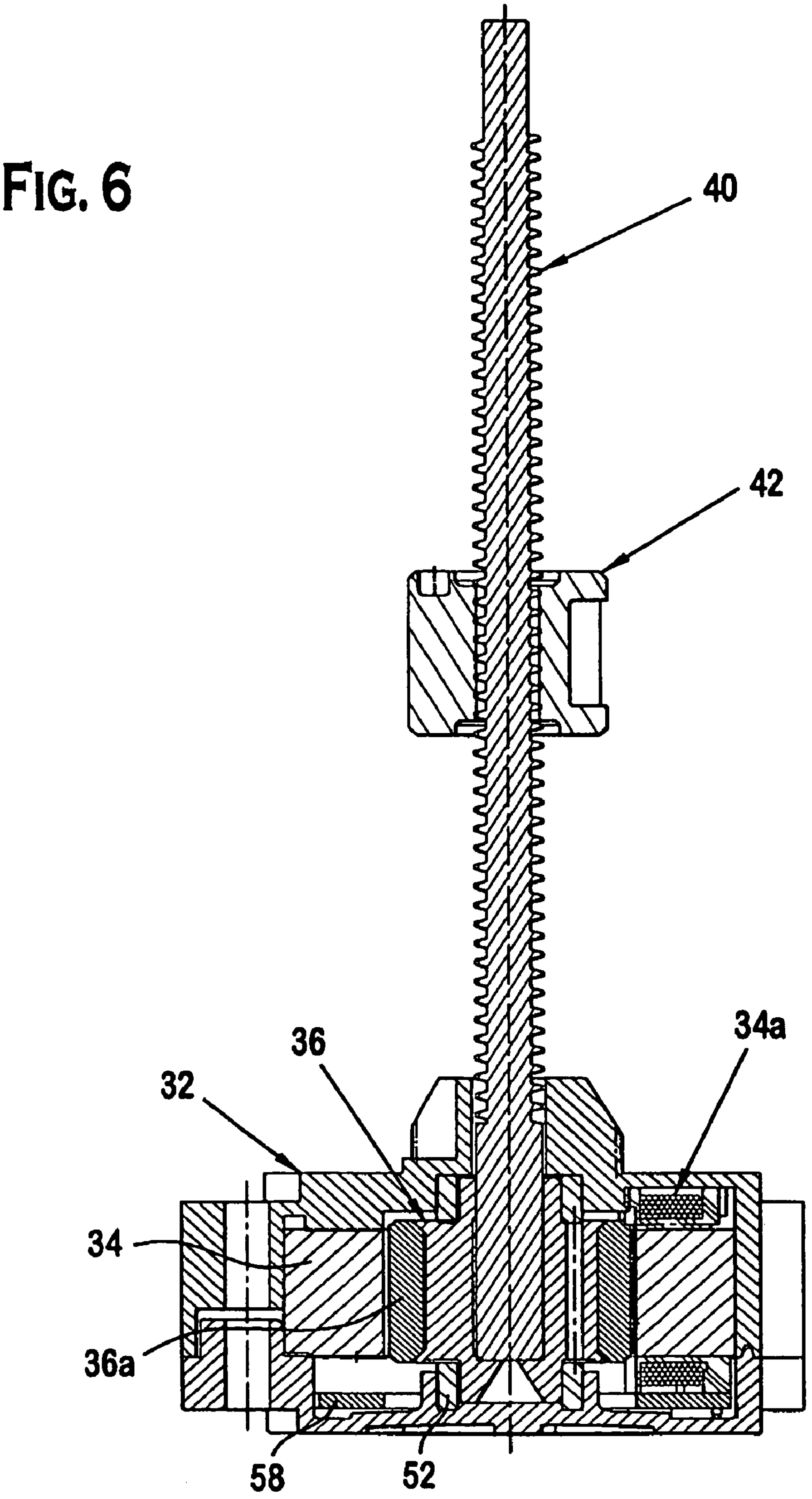
FIG. 6 is a cross-section taken along line VI-VI in FIG. 4.

The motor 32 is preferably constructed with a stator 34 that has a plurality of windings or coils 34*a* (e.g., one of three is shown in FIG. 6) that are angularly spaced around the axis of rotation (e.g., 120 degrees), and an armature 36 that includes a permanent magnet 36*a*. As is well understood, sequentially energizing and de-energizing each of the coils 34*a* set up individual magnetic fields that either attract or repulse the permanent magnet 36*a*, thereby causing the armature 36 to rotate. At the same time, rotation of the permanent magnet 36*a* induces in the coils 34*a* a current that can be used to determine angular movement, e.g., number of rotations of the armature 34. The phenomenon that creates this current is commonly referred to as back electro-motive force, or back emf.

The motor 32 is disposed in a housing 50 that preferably supports the threaded rod 40 for relative rotation. Antifriction devices such as a bearing 52 may be used at the interface of the threaded rod 40 and the housing 50. The housing 50 preferably includes a body portion 54, in which the motor 32 is disposed, and a coupling portion 56, by which the electrical connections are made with the motor 32. In order to facilitate assembly of the actuator 30, at least the body portion 54 of the housing 50 may be assembled from more than one piece. As particularly shown in FIG. 3, the body portion 54 may preferably be divided into a front piece 54*a* and a back piece 54*b*. An insert molded lead frame 58 may be disposed in the bottom of the back piece to make the electrical connections with the coils 34*a*.

The coupling portion 56 of the housing 50 preferably includes an enclosure portion 56*a* for a controller 60, and an interchangeable electrical connector portion 56*b*, which is preferably detachable with respect to the enclosure portion 56*a*. The interchangeable electrical connector portion 56*b* facilitates providing various configurations of electrical contacts to matingly engage different styles of plug connectors. It is envisioned that the body portion 54 and the enclosure portion 56*a* would be universally used, and a particular interchangeable electrical connector portion 56*b* would be selected according to the particular specification of the manufacturer for the vehicle chassis 12*a*.

The controller 60 that is disposed in the enclosure portion 56*a* of the coupling portion 56 preferably includes an application-specific integrated circuit (ASIC) 62 that can perform at least two functions: 1) driving the coils 34*a*, and 2) determining displacement of the pedal 22 with respect to the vehicle chassis 12*a*. The first function is commonly referred to as a motor drive circuit. The second function is performed by a processor based on the number of rotations of the armature 34, which is determined using back emf, as discussed previously, and the stored knowledge of the thread pitch of the threaded rod 40. The controller 60 preferably also includes a memory for different operational positions of the pedal 22, such as for the preferences of different operators of the vehicle.

In the event of a loss of the current operational position of the pedal, e.g., due to the motor 32 stalling, the controller 60 detects the stall and adjusts the pedal lever position or shuts down the respective actuator 30*a*,30*b*,30*c* so as to maintain the existing relationship between the corresponding pedal lever 20*a*,20*b*,20*c* and pedal 22*a*,22*b*,22*c*. When the controller 60 detects stall of the motor 32, e.g., based on unusual voltage and time characteristics exhibited by the drive circuit, the controller 60 may use an included software program to reestablish the predetermined relationship between the pedals 22*a*,22*b*,22*c*, or to reset the adjustable pedal system 10 by displacing all of the petals 22*a*,22*b*,22*c* to their extreme positions, as detected by the motors 32 stalling.

In the case of the adjustable petal system 10, it is desirable that adjustment of the actuators 30*a*,30*b*,30*c* be synchronized. A controller 60 for one of the actuators, e.g., 30*a*, is designated as the "master" controller, and sends signals to the "slave" controllers of the other actuators 30*b*,30*c*. The master may send disproportionate signals to the slave(s) in order to maintain the correct relative position of pedals 22*a*,22*b*,22*c*.

In operation, a device for adjusting the position of the pedals 22*a*,22*b*,22*c* can be effected by a switch, e.g., a rocker switch, that is manually actuated by the operator of the vehicle, or can be effected by a body controller unit which may interrelate a number of ergonomic and safety adjustments. For example, in the case of a vehicle equipped with a system of airbags, the body control unit may adjust the seat and pedal positions so that an occupant is a prescribed distance from the airbags.

An adjustable pedal system 10 that uses a body control unit may require as few as three electrical contacts for each actuator 30: a power contact, a ground contact, and a communication contact. The power and ground contacts supply the power required by the motor 32, and the communication contact may be connected via a digital serial communication link to the body control unit and to the communication contacts of additional actuators 30. In the case of a manual switch, two additional contacts may be required to connect the master actuator 30 with the wire from the increase spacing pole of the switch and with the wire from the decrease spacing pole of the switch; the communication contact would still be used by the master and slave actuators to communicate status regarding position, displacement speed, etc.

Incorporating a master or slave controller 60 that is mounted directly on each actuator 30 provides the present invention with a number of advantages. First, the present invention eliminates a separate controller that is additionally mounted on the chassis and then additionally connected to each of the actuators. Second, by virtue of having self-contained processing power, the present invention eliminates the need to draw processing capacity from other preexisting processors, e.g., engine control unit. Third, the present invention eliminates the need for a custom actuator for each pedal of each vehicle manufacturer, i.e., the actuator units are manufactured identically, and only distinguished as to master and slave roles during or after installation on the vehicle. Fourth, by virtue of the controller 60 processing the back emf signals from the coils 34*a*, the present invention eliminates the need for additional motor rotation sensors, e.g., an array of Hall effect sensors, which add cost, complexity and size. Fifth, by virtue of the controller 60 processing the back emf signals from the coils 34*a*, the present invention eliminates at least four wires from the wiring harnesses connecting each actuator 30. Sixth, the interchangeable electrical connector portion 56*b* of the present invention facilitates the universal applicability of the actuator 30 while providing an easy manner of adapting to varying styles of electrical plug connectors.

While the present invention has been disclosed with reference to certain preferred embodiments, numerous modifications, alterations, and changes to the described embodiments are possible without departing from the sphere and scope of the present invention, as defined in the appended claims. Accordingly, it is intended that the present invention not be limited to the described embodiments, but that it have the full scope defined by the language of the following claims, and equivalents thereof.

What is claimed is:

1. A system for adjustably positioning with respect to a vehicle chassis a plurality of pedals including an engine throttle control pedal and a brake system pedal, the system comprising:

a first electromagnetic actuator constructed and arranged to displace a first one of the engine throttle control pedal and brake system pedal with respect to the vehicle chassis;

a second electromagnetic actuator constructed and arranged to displace a second one of the engine throttle control pedal and brake system pedal with respect to the vehicle chassis;

a first controller defining a master controller constructed and arranged to operate the first electromagnetic actuator, the first controller being mounted directly on the first actuator; and a second controller separate from the first controller and defining a slave controller constructed and arranged to operate the second electromagnetic actuator in response to a signal sent by the first controller, the second controller being mounted directly on the second actuator.

2. The system according to claim 1, wherein the first electromagnetic actuator comprises a first electric motor, and the second electromagnetic actuator comprises a second electric motor.

3. The system according to claim 2, wherein the first electric motor comprises one of a stepper motor or a brushless motor, and the second electric motor comprises one of a stepper motor and a brush less motor.

4. The system according to claim 2, wherein the first electromagnetic actuator comprises a first converter of rotary motion to linear motion, and the second electromagnetic actuator comprises a second converter of rotary motion to linear motion.

5. The system according to claim 4, wherein the first converter of rotary motion to linear motion comprises a first threaded rod and a first nut cooperatively engaging the first threaded rod, and the second converter of rotary motion to linear motion comprises a second threaded rod and a second nut cooperatively engaging the second threaded rod.

6. The system according to claim 5, wherein the first electric motor rotates the first threaded rod with respect to the vehicle chassis and the first nut is constructed and arranged to be fixed to the first one of the engine throttle control and brake system pedals, and the second electric motor rotates the second threaded rod with respect to the vehicle chassis and the second nut is constructed and arranged to be fixed to the second one of the engine throttle control and brake system pedals.

7. The system according to claim 1, further comprising a third electromagnetic actuator constructed and arranged to displace a clutch pedal with respect to the vehicle chassis.

8. The system according to claim 7, wherein the third electromagnetic actuator comprises a third electric motor, a third threaded rod and a third nut cooperatively engaging the third threaded rod, the third electric motor rotates the third threaded rod with respect to the vehicle chassis and the third nut is constructed and arranged to be fixed to the clutch pedal.

9. The system according to claim 1, wherein the first electromagnetic actuator comprises a first electric motor including a first plurality of coils, and the second electromagnetic actuator comprises a second electric motor including a second plurality of coils.

10. The system according to claim 9, wherein the first controller is electrically coupled to the first plurality of coils, and the second controller is electrically coupled to the second plurality of coils.

11. The system according to claim 10, wherein the first controller is constructed and arranged to provide a first drive signal to the first plurality of coils, and the second controller is constructed and arranged to provide a second drive signal to the second plurality of coils.

12. The system according to claim 11, wherein the first plurality of coils provides a first feedback signal to the first controller, and the second plurality of coils provides a second feedback signal to the second controller.

13. The system according to claim 12, wherein the first controller determines the spacing between the vehicle chassis and the first pedal based on the first feedback signal, and the second controller determines the spacing between the vehicle chassis and the second pedal based on the second feedback signal.

14. The system according to claim 12, wherein the first feedback signal comprises a first current generated by electromagnetic forces during operation of the first electric motor, and the second feedback signal comprises a second current generated by electromagnetic forces during operation of the second electric motor.

15. The system according to claim 1, wherein each controller stores pedal position data.

16. A system for adjustably positioning with respect to a vehicle chassis a plurality of pedals including an engine throttle control pedal and a brake system pedal, the system comprising:

a first electromagnetic actuator constructed and arranged to displace a first one of the engine throttle control pedal and brake system pedal with respect to the vehicle chassis, the first electromagnetic actuator including a first housing;

a second electromagnetic actuator constructed and arranged to displace a second one of the engine throttle control pedal and brake system pedal with respect to the vehicle chassis, the second electromagnetic actuator includes a second housing spaced from the first housing;

a first controller defining a master controller constructed and arranged to operate the first electromagnetic actuator; and a second controller separate from the first controller and defining a slave controller constructed and arranged to operate the second electromagnetic actuator in response to a signal sent by the first controller.

17. The system according to claim 16, wherein the first housing comprises a first body portion and a first coupling portion, and the second housing comprises a second body portion and a second coupling portion.

18. The system according to claim 17, wherein the first electromagnetic actuator comprises a first electric motor disposed in the first body portion, and the second electromagnetic actuator comprises a second electric motor disposed in the second body portion.

19. The system according to claim 18, wherein the first controller is disposed in the first coupling portion, and the second controller is disposed in the second coupling portion.

20. The system according to claim 19, wherein the first coupling portion comprises a first interchangeable electrical connector, and the second coupling portion comprises a second interchangeable electrical connector.

21. The system according to claim 20, wherein the first and second interchangeable electrical connectors comprise a plurality of variously configured electrical contacts.

22. A system for adjustably positioning with respect to a vehicle chassis a plurality of pedals including an engine throttle control pedal and a brake system pedal, the system comprising:

a first electromagnetic actuator constructed and arranged to displace a first one of the engine throttle control pedal and brake system pedal with respect to the vehicle chassis, the first electromagnetic actuator including a first housing;

a second electromagnetic actuator constructed and arranged to displace a second one of the engine throttle control pedal and brake system pedal with respect to the vehicle chassis, the second electromagnetic actuator including a second housing spaced from the first housing;

a first controller defining a master controller constructed and arranged to operate the first electromagnetic actuator, the first controller being disposed in the first housing; and a second controller separate from the first controller and defining a slave controller constructed and arranged to operate the second electromagnetic actuator in response to a signal sent by the first controller, the second controller being disposed in the second housing.

23. The system according to claim 22, wherein the first controller comprises a first application specific integrated circuit, and the second controller comprises a second application specific integrated circuit.

24. The system according to claim 23, wherein the first controller determines the spacing between the vehicle chassis and the first pedal based on a first feedback signal supplied from the first electric motor to the first controller, and the second controller determines the spacing between the vehicle chassis and the second pedal based on a second feedback signal supplied from the second electric motor to the second controller.

* * * * *